(12) United States Patent
Clark et al.

(10) Patent No.: US 7,651,144 B2
(45) Date of Patent: Jan. 26, 2010

(54) SEAL WATER CATCH FOR RECREATIONAL VEHICLE

(75) Inventors: Gregory M. Clark, Chardon, OH (US);
James T. Clark, II, Kirtland, OH (US);
Jeff A. Lippus, Olmstead, OH (US)

(73) Assignee: Clark Rubber & Plastic Company, Mentor, OH (US)

( * ) Notice: Subject to any disclaimer, the term of this patent is extended or adjusted under 35 U.S.C. 154(b) by 114 days.

(21) Appl. No.: 11/986,813

(22) Filed: Nov. 27, 2007

(65) Prior Publication Data
US 2009/0134670 A1    May 28, 2009

(51) Int. Cl.
*B60J 10/00* (2006.01)
(52) U.S. Cl. .................... 296/26.12; 296/165; 49/476.1; 49/484.1; 277/644; 277/648; 277/921
(58) Field of Classification Search ................. 296/165, 296/170, 175, 26.09, 172, 176, 26.13, 154, 296/126.09, 213; 49/476.1, 484.1, 495.1, 49/490.1; 277/551, 568, 644, 648, 921
See application file for complete search history.

(56) References Cited

U.S. PATENT DOCUMENTS

| | | | | |
|---|---|---|---|---|
| 3,238,574 A | * | 3/1966 | Martin et al. | 52/171.1 |
| 3,320,700 A | * | 5/1967 | Bohn | 49/404 |
| 3,672,424 A | * | 6/1972 | Brown | 160/40 |
| 5,894,698 A | * | 4/1999 | Dewald et al. | 52/67 |
| 6,332,645 B1 | * | 12/2001 | Schwarz | 296/216.09 |
| 6,685,263 B2 | * | 2/2004 | Sawada et al. | 296/216.06 |
| 6,966,590 B1 | * | 11/2005 | Ksiezopolki et al. | 296/26.01 |
| 2006/0260216 A1 | * | 11/2006 | Bonshor | 52/97 |

\* cited by examiner

*Primary Examiner*—Patricia L Engle
*Assistant Examiner*—Sunsurraye Westbrook
(74) *Attorney, Agent, or Firm*—Renner, Kenner, Greive, Bobak, Taylor & Weber

(57) ABSTRACT

A seal between a base structure and a slide out structure of a recreational vehicle includes a panel section mounted to the base structure, the panel section including a front edge, a rear edge, a first side and a second side. A sealing element extends from the panel section, between the front edge and the rear edge, in a direction from the first side toward the second side of the panel section, the sealing element extending to contact the slide out structure and wipe moisture therefrom upon relative movement of the slide out structure and base structure. A catch flange extends upwardly from the rear edge of the panel section. A first side basin detail extends from the first side of the panel section, and a second side basin detail extends from the second side of the panel section. The catch flange, the first side basin detail and the second side basin detail define a water catch that is open at the front edge of the panel section, the water catch collecting moisture wiped from the slide out structure by the sealing element.

5 Claims, 4 Drawing Sheets

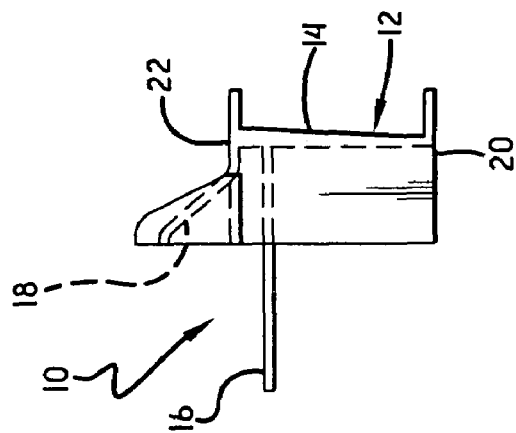
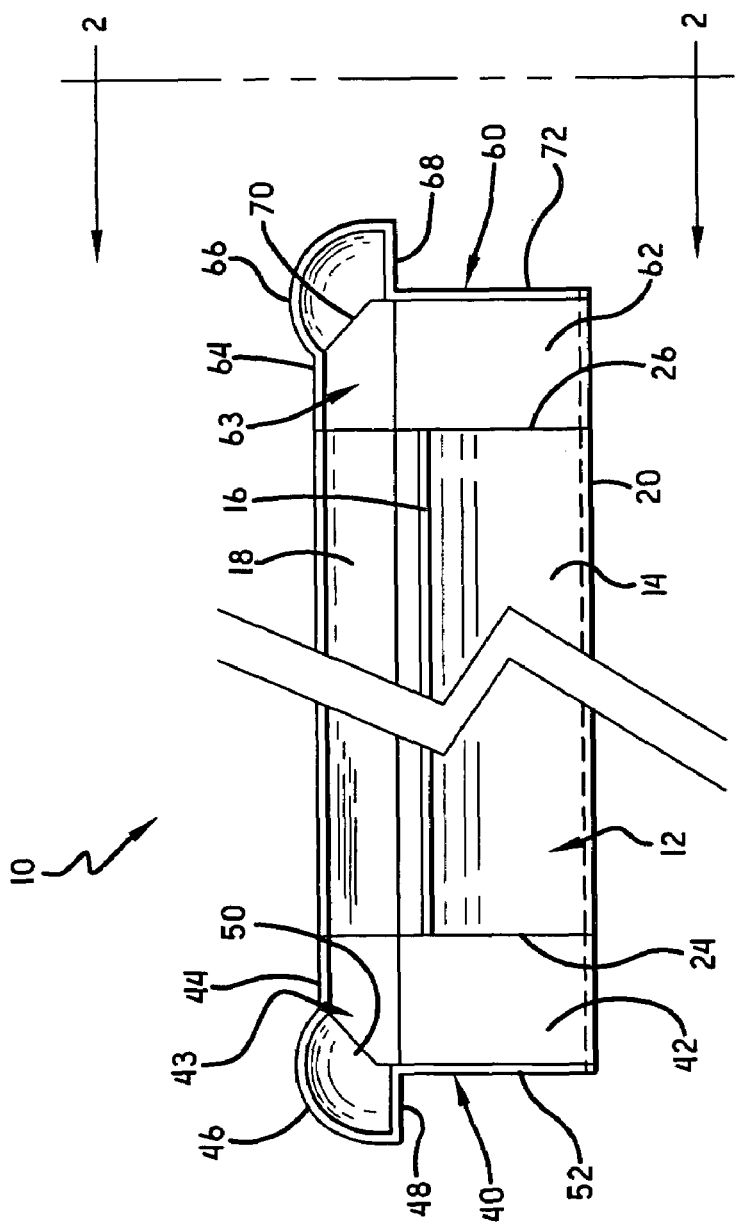
FIG.-2
FIG.-1

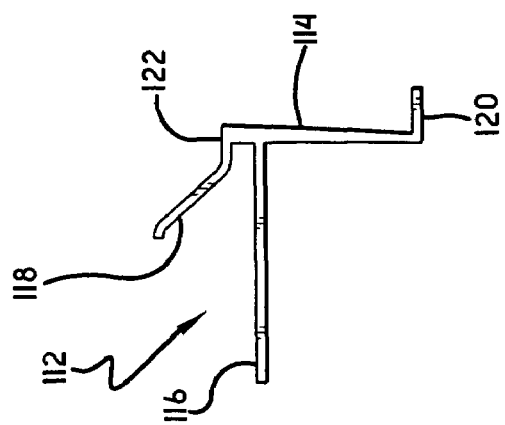
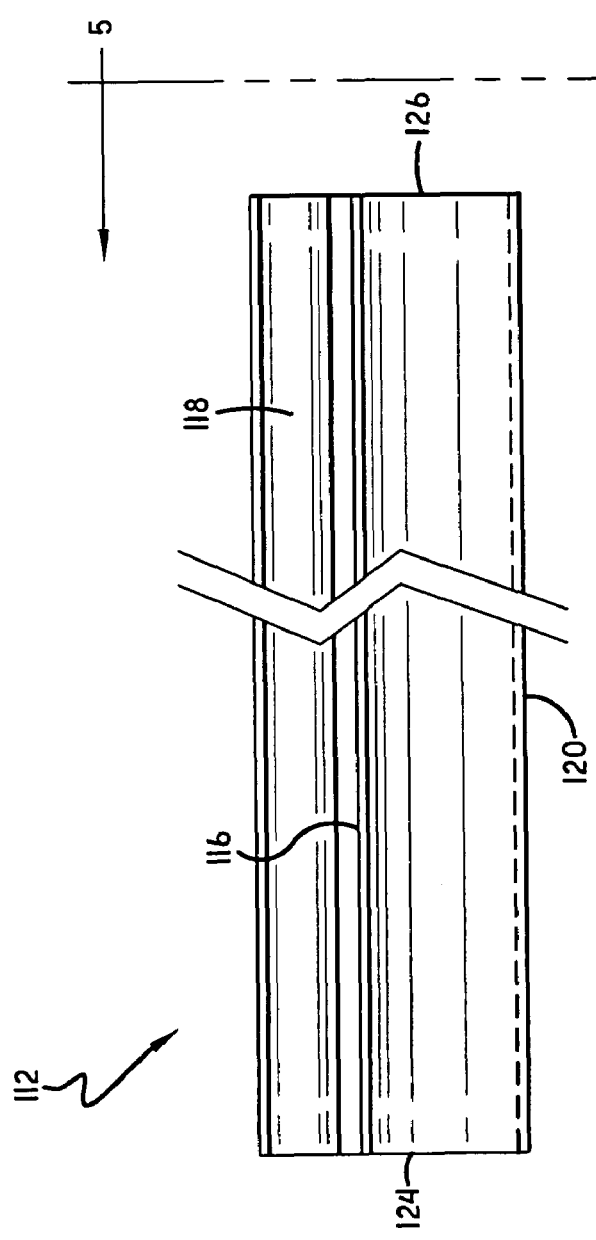

SEAL WATER CATCH FOR RECREATIONAL VEHICLE

TECHNICAL FIELD

In general, the present invention relates to a seal for a recreational vehicle. More particularly, the present invention relates to a seal and water catch for positioning between a slide out room and a base structure of a recreation vehicle.

BACKGROUND OF THE INVENTION

Many recreational vehicles (RV's) include slide out rooms, which are understood to be rooms having a base structure and a slide out structure that move relative to one another, with the relative movement resulting in an increase or decrease in the size of the room formed by the base structure and slide out structure. Without limitation, these slide out rooms typically have a movable slide out structure that telescopes in and out of a stationary base structure that is mounted to the chassis and provides the interior of the RV. The slide out structure typically includes floor and wall structures that parallel the floor and wall structures of the base structure. The slide out structure typically includes walls on three sides, as well as a roof and floor. The fourth wall space is open to the interior of the RV so that the interior of the slide out structure communicates with the interior of the base structure. The slide out structure is moved outwardly relative to the base structure to increase the usable interior space of the RV, and is moved inwardly to decrease such space.

The gaps between the walls of the base structure and those of the slide out structure preferably include seals to isolate the interior of the RV from the outside elements, maintaining insulation properties and protection from inclement weather. It is appreciated that moisture from condensation or inclement weather can accumulate on the slide out structure, and can undesirably enter the interior of the RV when the slide out structure is retracted into the base structure. Thus the present invention provides a seal and water catch structure that can prevent or at least minimize the occurrence of moisture entering into the interior of the RV upon relative movement of the base structure and slide out structure.

SUMMARY OF THE INVENTION

The present invention generally provides a seal between a base structure and a slide out structure of a recreational vehicle, wherein the slide out structure moves relative to the base structure. The seal includes a body portion secured to the base structure of the recreational vehicle and having a panel section with a front edge, a rear edge, a first side and a second side. A sealing element extends upwardly from the panel section, between the front edge and the rear edge, in a direction from the first side toward the second side of the body portion. The sealing element extends to contact the slide out structure. A catch flange extends upwardly from the rear edge of the body portion. A first side basin detail extends from the first side of the body portion, and a second side basin detail extending from the second side of the body portion, the catch flange, the first side basin detail and the second side basin detail defining a water catch open at the front edge of the body portion.

BRIEF DESCRIPTION OF THE DRAWINGS

For a complete understanding of the objects, techniques and structure of the invention, reference should be made to the following detailed description and accompanying drawings, wherein:

FIG. 1 is a top plan view of a seal and water catch in accordance with an embodiment of this invention;

FIG. 2 is a side elevation view along the line 2-2 of FIG. 1;

FIG. 4 is a top plan view of a body portion of a seal and water catch in accordance with another embodiment of this invention;

FIG. 5 is a side elevation view along the line 5-5 of FIG. 4;

DETAILED DESCRIPTION

Figure 3:
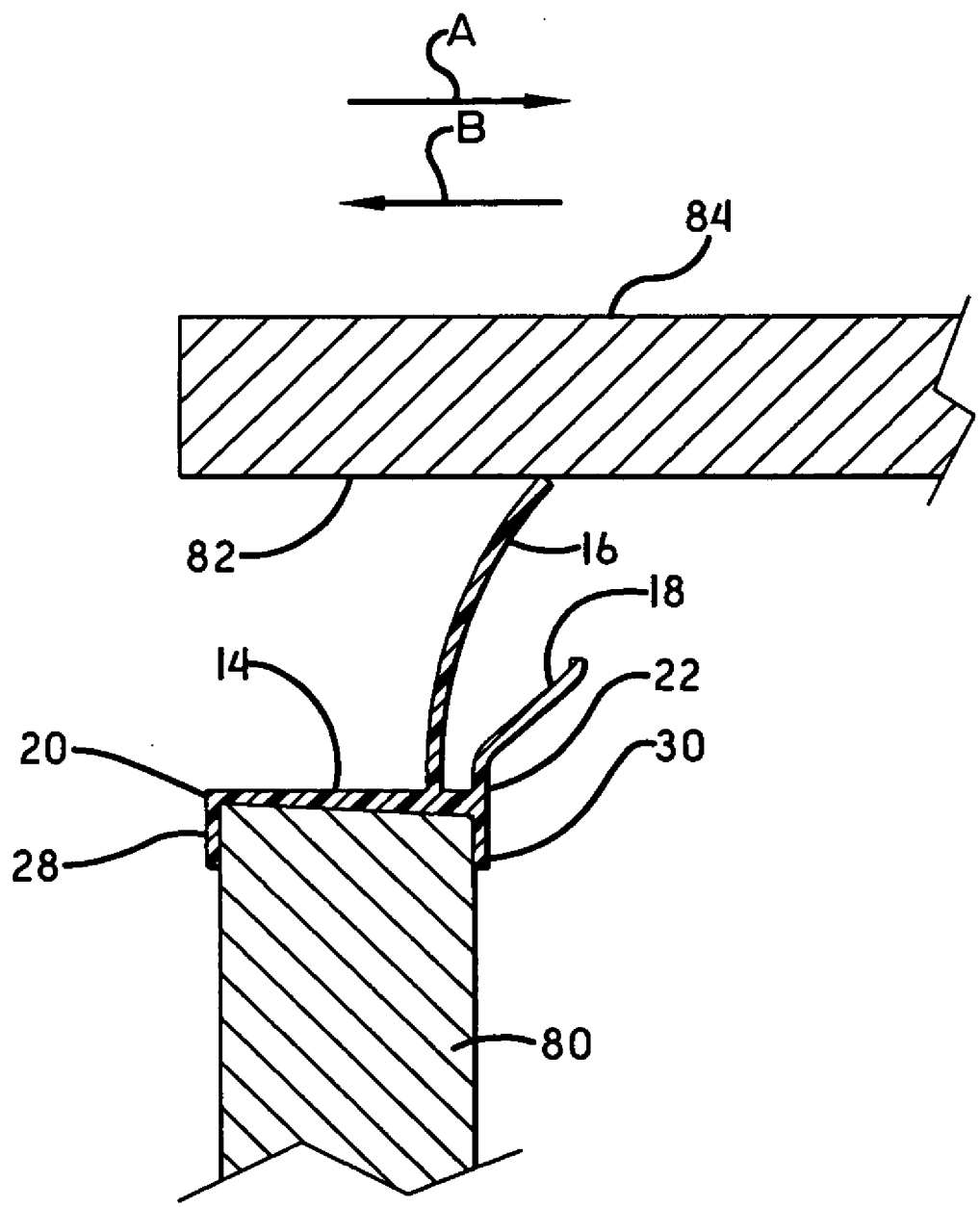
FIG. 3 is a cross sectional view depicting operation of the seal and water catch of this invention, the seal being mounted to a recreational vehicle between a base structure and a slide out structure.

The present invention relates to a seal and water catch used on RV's with slide-out rooms. The seal is placed between a base structure and a slide out structure of the RV and permits the slide out room to move in and out relative to the base structure, while keeping any moisture from entering the RV.

One example of a seal according to the concepts of the present invention is generally indicated by the numeral 10 in FIGS. 1 and 2. Seal 10 generally includes a body portion 12 and first and second side basin details 40, 60.

Body portion 12 includes a panel section 14, a sealing element 16 and a catch flange 18. Panel section 14 includes a front edge 20, a rear edge 22, a first side 24 and an opposed second side 26. Sealing element 14 extends upwardly from panel section 14, between front edge 20 and rear edge 22, in a direction from first side 24 toward second side 26. Preferably, for symmetry and ease of manufacture, sealing element 16 runs parallel to front edge 20 and rear edge 22, as shown, though this invention will function without such a specific structure. Catch flange 18 extends upwardly and rearwardly of rear edge 22 and helps to define a water catch with the side basin details 40, 60 and body portion 12.

First side basin detail 40 extends from first side 24 of panel section 14, and has a base panel 42 serving as an extension of panel section 14 and a basin wall 43 serving as an extension of catch flange 18. Basin wall 43 includes a rear wall 44 extending upwardly from base panel 42 and extending from catch flange 18. From rear wall 44, basin wall 43 curves around to the side, at curve 46, and continues inwardly at step 48 to provide a basin 50. From step 48, basin wall 43 continues forwardly to provide a side wall 52. Similarly, second basin detail 60 extends from second side 26 of panel section 14, and has a base panel 62 serving as an extension of panel section 14 and a basin wall 63 serving as an extension of catch flange 18. Basin wall 63 includes a rear wall 64 extending upwardly from base panel 62 and extending from catch flange 18. From rear wall 64, basin wall 63 curves around to the side, at curve 66, and continues inwardly at step 68 to provide a basin 70. From step 68, basin wall 63 continues forwardly to provide a side wall 72. Body portion 12, particularly panel section 14 and catch flange 18, together with first side basin detail 40 and second side basin detail 60 defines a water catch that is open at the front edge of the body portion 12.

The complete seal 10, including body portion 12 and basin details 40, 60, may be formed either integrally or as separate assembled pieces. In particular embodiments, body portion 12 is formed by extrusion, basin details 40, 60 are molded, and seal 10 is created by joining the molded basin details 40, 60 to the extruded body portion 12. A particular embodiment of this practice will be disclosed more fully later on in this description.

With particular reference to FIG. 3, it is seen that panel section 14 is suitably secured to the base structure 80 of the recreational vehicle, and sealing element 16 extends upwardly therefrom to contact the underside 82 of a slide out structure 84 of the recreational vehicle. Panel section 14 may be secured to the base structure 80 in any suitable manner, as by fasteners or adhesive or both. In this embodiment, panel section 14 includes front mounting ridge 28 and rear mounting ridge 30 to aid in mounting the seal 10 to the recreational vehicle. Both front and rear mounting ridges 28, 30 extend downwardly from the panel section 14 toward the recreational vehicle and can be secured to an appropriately shaped receiver on the recreational vehicle. Here, front mounting ridge 28 is secured over the corner of an outer edge of the base structure 80, and rear mounting ridge 30 extends over an inner edge thereof. The front mounting ridge 28 communicates with the exterior of the base structure 80 and the recreational vehicle in general, while the rear mounting ridge 30 is interior relative to the base structure 80 and the recreational vehicle in general. A pressure sensitive adhesive tape 86 or other adhesive means may be provided for securing the panel section 14 to the base structure 80, and fasteners such as screws and nails can be placed every 8 inches or so along its length to further secure the seal 10 as needed.

It should be appreciated that, when the slide out structure 84 is moved in the direction of either arrow A or arrow B, it moves relative to sealing element 16, and sealing element 16 wipes the underside 82, causing the condensation or moisture thereon to be wiped from the underside 82. The moisture runs down sealing element 16 to be collected in the volume generally defined by panel section 14, catch flange 18, base panels 42, 62 and basin walls 43, 63. This "volume" is conceptual and not actual inasmuch as no front wall exists at the front edge 20 of body portion 12, but it will be appreciated that the seal 10 does have the ability to at least temporarily hold water or other liquid. The catch flange 18 and basin walls 43, 63 serve to prevent the collected moisture from entering the recreational vehicle and contacting the base structure. In use, any liquid wiped down into or otherwise collected by seal 10 will tend to flow to the exterior of base structure 80 in light of the fact that, as mounted, panel section 14 slopes from rear edge 22 to front edge 20, to which front mounting ridge 28 is mounted. This slope is created by having panel section 14 being thicker at rear edge 22 and thinner at front edge 20 such that it slopes toward front edge 20 when mounted to a generally horizontal surface, as shown. This sloped aspect of body portion 12 is preferred only, as the seal 10 can function beneficially without such a slope.

Figure 6:
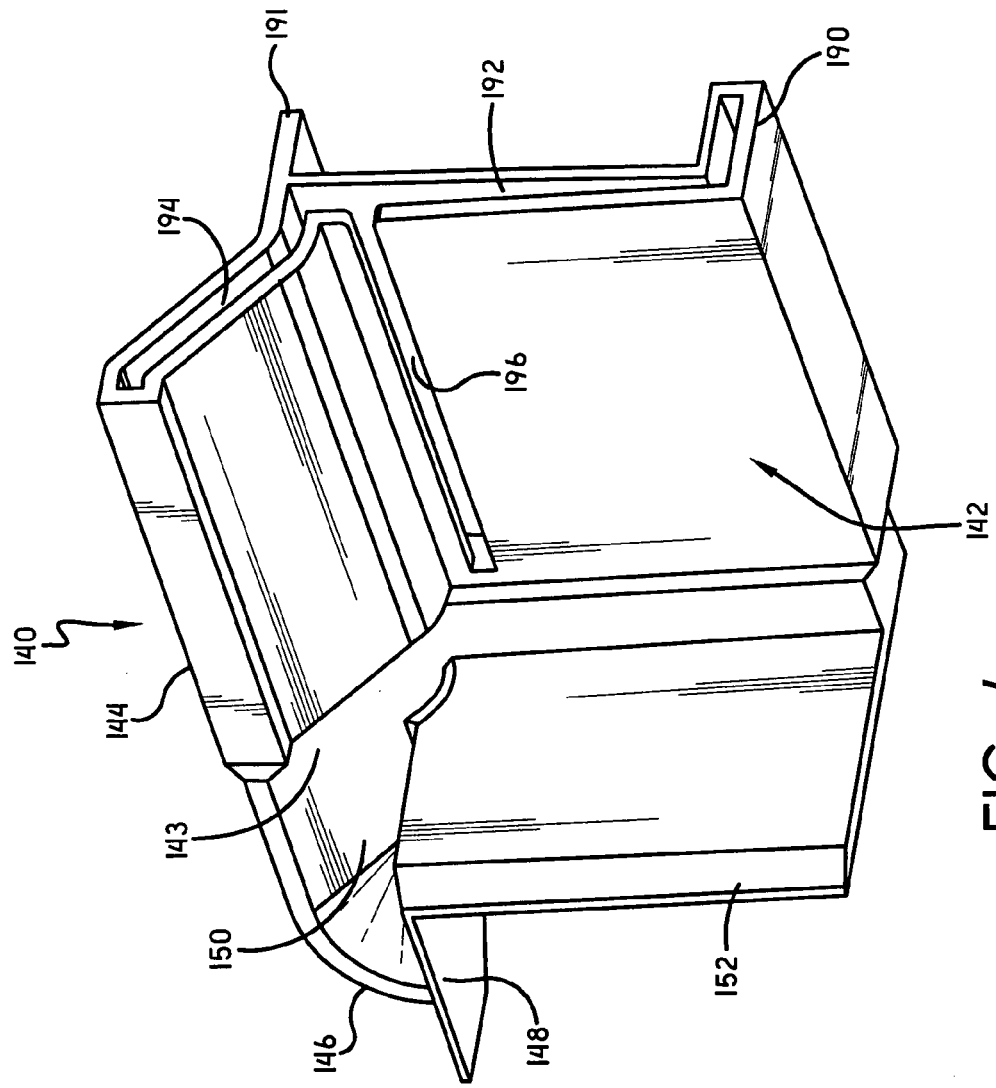
FIG. 6 is a perspective view of a side basin detail for fitting to the body portion of FIG. 4.

Another embodiment of a seal and water catch of this invention is shown in FIGS. 4-6, and shows how a seal and water catch 110 can be formed from a separate body portion 112 having basin details 140 (FIG. 6) secured to each end of the body portion 112. Only one basin detail 140 is shown in FIG. 6, with the understanding that a basin detail that is a mirror image of basin detail 140 could be attached to the other end of body portion 112.

In this embodiment, body portion 112 is formed, preferably by extrusion, but is a separate element from basin details 140 such that first side 124 and opposed second side 126 define side edges of the panel section 114. Catch flange 118 extends upwardly and rearward of rear edge 122 and helps to define a water catch with the side basin details 140, once they are mounted to body portion 112. Panel section 114 may still slope from rear edge 122 to front edge 120 as shown, but, in this embodiment, the side basin details 140 can be configured with the preferred slope. Additionally, panel section 114 need not include a front mounting ridge and a rear mounting ridge because the side basin details can include these features, as seen in FIG. 6 at front mounting ridge 190 and rear mounting ridge 191. Although not necessary or required, panel section 114 is shown with a front mounting ridge 128 to enter into panel mount slot 192 at front mounting ridge 190.

A side basin detail 140 is shown in FIG. 6. As with side basin detail 40, it has a base panel 142 serving as an extension of panel section 114 and a basin wall 143 serving as an extension of catch flange 118. However, base panel 142 includes a panel mount slot 192 to receive panel section 114, and rear wall 144 of basin wall 143 includes catch flange mount slot 194 to receive catch flange 118. A sealing element slot 196 is provided in base panel 142 to permit passage of sealing element 116. FIG. 6 makes it apparent that the shape of these slots are complimentary to the cross section of body portion 112 so as to intimately fit side basin detail 140 on the ends of body portion 112. At rear wall 144, basin wall 143 is not dual walled for its entire length, but, rather the two wall join together and the single wall curves around to the side, at curve 146, and continues inwardly at step 148 to provide a basin 150. From step 148, basin wall 143 continues forwardly to provide a side wall 152. Body portion 112, catch flange 118, and two side basin details 140 (the one of FIG. 6 and the mirror image thereof) together define a water catch that is open at the front edge of the body portion 112.

In the embodiments shown, sealing elements 16, 116 are in the form of a flap, which may be referred to as a wiper seal. These sealing elements generally extend upwardly from the body portion an extent sufficient to perform their given sealing function. It will be appreciated that some applications will require greater extension than others. Sealing elements may be at least somewhat flexible allowing them to conform to the surface against which they bear. Therefore, relative to the body portions 12, 112, which may be made substantially rigid, a softer material may be used to form the sealing elements 16, 116. In the example shown, a 40A thermoplastic elastomer is used to form the body portion 12 and a 40D thermoplastic elastomer is used to form the sealing elements 16. The basin details may be substantially rigid. It will be appreciated that the hardness of each portion of seal 10 may vary depending on a given application. Thus, any discussion of the relative hardness of each section is not to be considered limiting.

Seals in accordance with this invention may be manufactured by an extrusion process and cut into selected lengths. Co-extrusion may be used to obtain different material properties for the body portions and sealing elements. For example, softer material for the sealing element may be co-extruded with a harder body portion material to obtain a substantially rigid body portion and flexible sealing elements.

In accordance with the patent statutes, embodiments of a seal and water catch according to the concepts of the present invention have been shown and described. It will be appreciated that various modifications may be made to the described seal without departing from the spirit and scope of the invention. For an appreciation of the scope of the invention, reference should be made to the appended claims.

The invention claimed is:

1. A seal between a base structure and a slide out structure of a recreational vehicle, wherein the slide out structure moves relative to the base structure, the seal comprising:
   a panel section mounted to the base structure, said panel section including a front edge, a rear edge, a first side and a second side;
   a sealing element extending from said panel section, between said front edge and said rear edge, in a direction from said first side toward said second side of said panel section, said sealing element extending to contact said slide out structure and wipe moisture therefrom upon relative movement of the slide out structure and base structure;
   a catch flange extending upwardly from said rear edge of said panel section;
   a first side basin detail extending from said first side of said panel section; and
   a second side basin detail extending from said second side of said panel section, said catch flange, said first side basin detail and said second side basin detail defining a water catch that is open at the front edge of said panel section, said water catch collecting moisture wiped from said slide out structure by said sealing element.

2. The seal of claim 1, wherein said panel section slopes from said rear edge to said front edge when mounted to the base structure.

3. The seal of claim 1, wherein said front edge of said panel section is secured over an outer edge of the base structure communicating with the exterior of the recreational vehicle.

4. The seal of claim 1, wherein said panel section, said sealing element and said catch flange form an integral body portion to which said first and second side basin details are secured.

5. The seal of claim 4, wherein said first side basin detail and said second side basin detail each include:
   a base panel having a panel mount slot, for receiving a portion of said panel section, and a sealing element slot, for receiving a portion of said sealing element; and
   a rear wall having a catch flange mount slot for receiving a portion of said catch flange.

* * * * *